United States Patent Office 3,728,328
Patented Apr. 17, 1973

3,728,328
COBALT COMPLEXES OF AN AZO COMPOUND AND A TRIDENTATE ORGANIC LIGAND
Paul Lienhard, Riehen, Fabio Beffa, Basel, and Charles Soiron, Riehen, Switzerland, assignors to J. R. Geigy A.G., Basel, Switzerland
No Drawing. Continuation-in-part of application Ser. No. 496,651, Oct. 15, 1965. This application Mar. 11, 1968, Ser. No. 711,887
Claims priority, application Switzerland, Oct. 20, 1964, 13,579/64
Int. Cl. C09b 45/10, 45/20, 45/30
U.S. Cl. 260—147                                                       10 Claims

ABSTRACT OF THE DISCLOSURE

Complex azo dyestuff-cobalt compounds consisting essentially of, per molecule:
a cobalt atom:
one molecule of a colorless tridentate organic ligand which is coordinatively bound to said colbalt atom by way of three nitrogen atoms and which is free from ionogenic groups which do not partake in complex formation, each of said nitrogen atoms participating in the formation of a five- to six-membered ring of which said cobalt atom is a member; and
one radical of an azo dyestuff, bicyclically bound to the cobalt atom and being free from groups which are capable of dissociating acid in water but do not partake in complex formation, whereby the thus constituted complex is rendered cationic;
and one equivalent of a colorless anion, are disclosed; they are useful for coloring organic polymeric materials and especially for dyeing acrylic fibers from an aqueous bath.

---

This application is a continuation-in-part of pending application Ser. No. 496,651, and now abandoned.

The present invention concerns new cobalt-containing azo dyestuffs, a process for the production thereof, their use for the coloring of polymeric organic materials and especially for the dyeing of organic fiber materials, as well as, as industrial products, the organic materials dyed or pigmented with the new cobalt-containing azo dyestuffs.

It has been found that valuable, strongly colored and light-fast cobalt-containing azo dyestuffs are obtained by reacting a complex cobalt (III) compound containing per cobalt atom two molecules of a colorless tridentate, organic ligand which is bound in complex linkage to the cobalt atom by way of three nitrogen atoms of said ligand having an electronic pair available for complex coordination bonding to colbalt, with an azo dyestuff capable of forming bicyclic metal complexes with cobalt, whereby complex azo dyestuff-cobalt compounds which contain a colorless, tridentate, organic ligand of the type mentioned above bound in complex linkage, are produced. The starting cobalt (III) complex compounds are referred to hereinafter as "complex Co$^{\mathrm{III}}$-ligand compounds."

While a known complex cobalt compound which contains, per cobalt atom, one radical of the azomethine dyestuff obtained from 2-hydroxy-benzaldehyde and 4-chloro-2-aminophenol, and one molecule of diethylenetriamine as ligand, produces insufficiently peroxide wash-fast dyeings on polymeric and copolymeric acrylonitrile fiber material, the corresponding cobalt-azo complex dyestuff according to the invention is of good peroxide wash fastness on these materials.

The colorless, tridentate ligand in the starting complex Co$^{\mathrm{III}}$-ligand compound is bound to the cobalt atom by way of three nitrogen atoms, wherein each of these nitrogen atoms is, for instance, in a primary or a secondary or tertiary amino group, e.g. an amino group substituted as defined below or a piperidino, C-pyridyl, C-quinonyl, triazinyl or C,C-pyridylene group, a substituted or unsubstituted imino group, nitrilo group, oximido group, hydrazino group or hydrazone group, substitution of said substituted amino and imino groups preferably being by a member selected from the group consisting of lower alkyl, phenyl, benzyl or cyclohexyl.

The cobalt-complexing nitrogen atoms in the ligand molecule are advantageously separated from one another by a two- or three-membered, saturated or unsaturated sequence consisting of carbon atoms or carbon and nitrogen atoms, each of the cobalt-complexing nitrogen atoms and the aforesaid sequence of atoms can be part of a ring or ring system which is preferably five- or six-membered.

Preferred complex azo dyestuff-cobalt compounds consist essentially of, per molecule:

(i) one cobalt atom;
(ii) one molecule of a colorless tridentate organic ligand being free from ionogenic groups which do not partake in complex formation, and consisting of:
   (α) three moieties each of which contains a nitrogen atom coordinatively bound to said cobalt atom, and is selected from
      (a)—NH$_2$;
      (b)

wherein R$^1$ represents hydrogen or lower alkyl
   and R$^2$ represents lower alkyl, phenyl, benzyl or cyclohexyl;
      (c)=N—R$^2$ wherein R$^2$ has the same meaning as under (b);
      (d)=N—;
      (e)—NH—NH$_2$;
      (f)=N—NH$_2$;
      (g)=N—OH;
      (h) piperidino;
      (i) C-pyridyl;
      (j) C-quinonyl;
      (k) 2,4-s-triazinylene, the 6-position of which is substituted by a non-coordinatively bound amino group or by lower alkoxy; and
      (l) C,C-pyridylene; and
   (β) from 0 to 2 bridging members selected from =CH—, alkatriyl of from 3 to 4 carbon atoms, alkylene of from 1 to 3 carbon atoms, phenylene and cyclohexylene; any unoccupied single or double bonds of a nitrogen atom of any of groups (a) to (h) inclusive, present therein being linked to a carbon atom of another one of said three moieties which is selected from (b), (c), (i), (j), (k) or (l) or to a carbon atom of one of said bridging members, each of said nitrogen atoms participating in the formation of a five- or six-membered ring of which said cobalt atom is a member;
(iii) one radical of a monoazo dyestuff or disazo dyestuff which radical is bicyclically bound to the said cobalt atom and which radical is free from groups capable of dissociating acid in water but not partaking in complex formation, whereby the thus constituted complex is rendered cationic, and
(iv) one equivalent of the anion of a monobasic or dibasic inorganic acid or of an aliphatic monocarboxylic or dicarboxylic acid.

Examples of ligands as defined above under (ii) and described, infra, by using the nomenclature according to F. P. Dwyer and D. P. Mellor, "Chelating Agents and Metal Chelates," pages 144 et seq. are:

1-amino-2-(β-amino-ethylamino)-cyclohexane,
2,2'-diaminodicyclohexylamine,
1-amino-2-(β-amino-ethylamino)-benzene,
2,2'-diamino-diphenylamine,
2,6-(di-2'-pyridyl)-pyridine,
("Terpyridyl"),
8-(2'-amino-phenylamino)-quinoline,
(2-pyridyl-methylene-aminoethyl)-diethylamine,
1-(diethylamino)-2-(2'-pyridyl-methylene-amino)-benzene,
1-(dimethylamino)-2-(2'-pyridyl-methyleneamino)-cyclohexane,
2-(2'-pyridyl-methylene-amino-methyl)-pyridine,
8-(2'-pyridyl-methyleneamino)-quinoline,
2,6-bis(benzylaminomethylene)-pyridine,
2,6-bis-(aminomethyl)-pyridine,
pyridine-2,6-dialdehyde dioxime,
pyridine-2,6-dialdehyde-dihydrazone,
2-methoxy-4,6-dihydrazino-1,3,5-triazine,
2-amino-4,6-dihydrazino-1,3,5-triazine The most important ligands are, however, dialkylenetriamines and triaminoalkanes due to the particularly good stability of the complexes containing them. Examples of dialkylenetriamines are diethylenetriamine, monoethylene-monopropylenetriamine, dipropylenetriamine and their N-alkylated products, N,N-bis(β-phenylaminoethyl)-N-ethylamine, N,N''-dibenzyldiethylenetriamine, N,N-bis-(β-N'-piperidinoethyl)-N-ethylamine; examples of triaminoalkanes are: α,βγ-triaminopropane, α,β,δ-triaminobutane and α,γ-diamino-β-(aminomethyl)propane.

Diethylenetriamine is particularly preferred amongst ligands which contain three nitrogen-containing groups as complex-forming groups. This ligand affords very stable cobalt-containing azo dyestuffs in good yield rates.

In the complex Co$^{III}$-ligand compounds used as starting material, the two ligands can be identical or different: preferably they are identical and belong to the class of dialkylenetriamines and triaminoalkanes. Preferred complex Co$^{III}$-ligand compounds are water-soluble bis-(diethylenetriamine)-cobalt(III) salts, e.g. the corresponding chloride, bromide, sulfate, per chlorate or acetate.

The complex Co$^{III}$-ligand compounds used as starting materials are produced, for example, by reacting the colorless ligand with a cobalt(III) salt such as cobalt (III) hexamine trichloride in aqueous or aqueous-organic solution. Instead of cobalt (III) salts, also cobalt(II) salts can be used, for example, cobalt(II) chloride, sulfate or acetate. In this case, subsequent oxidation to form the Co$^{III}$-ligand compound is necessary. Mainly atmospheric oxygen or hydrogen peroxide are used as oxidizing agents.

Azo dyestuffs which are capable of forming bicyclic metal complexes and hence are usable according to the invention are well known, or can be produced by well-known methods. Especially those azo dyestuffs are useful which fall under the formula

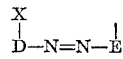

(I)

In this formula

D represents a radical of the benzene or naphthalene series wherein X is in a position adjacent to the azo bridge, E represents the radical of a coupling component coupling in a position ortho to X', X represents hydroxyl, carboxyl, an alkylsulfonamido group, e.g. the methylsulfonamido, or an arylsulfonamido group, wherein "aryl" is preferably mononuclear, e.g. the p-methylphenylsulfonamido group, or a substituent which can be converted into such a group, and X' represents a hydroxyl group or a primary or secondary amino group, or D and X are part of a heterocyclic radical of one of the formulas

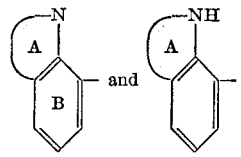

wherein the ring A consists of a total of five or six ring members and the rings A and B can be further substituted.

More particularly, the dyestuff radical

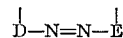

represents (a) a benzene-azo-benzene,
(b) a benzene-azo-naphthalene,
(c) a benzene-azo-1-aryl-5-pyrazolone,
(d) a benzene-azo-1-aryl-5-amino-pyrazole,
(e) a benzene-azo-acyloaceto-arylamide,
(f) a benzene-azo-benzene-azo-naphthalene,
(g) a naphthalene-azo-naphthalene,
(h) a naphthalene-azo-1-aryl-5-pyrazolone,
(i) a naphthalene-azo-1-aryl-5-aminopyrazole or
(j) a naphthalene-azo-acyloaceto-arylamide dyestuff radical or the dyestuff radical

represents (k) a benzotriazole-azo-naphthalene,
(l) a benzotriazole-azo-1-aryl-5-pyrazolone or
(m) a benzotriazole-azo - 1 - aryl-5-aminopyrazole dyestuff radical.

Particularly preferred are the dyestuff radicals listed above under (a) to (h) and (k). In the above listed dyestuff radicals 1-aryl-pyrazolone moiety is more especially a 1-phenyl-pyrazolone moiety, a 1-aryl-5-aminopyrazole moiety is preferably a 1-phenyl-5-aminopyrazole moiety, and an acyloaceto-arylamide moiety is more particularly an acyloaceto-phenylamide moiety.

D and E can contain the substituents usual in dyestuffs, for example, nucleophilic substituents such as hydrocarbon radicals, particularly lower alkyl groups, ether groups, preferably lower alkoxy groups, or acylamino groups, e.g. alkanoylamino, aroylamino, alkylsulfonylamino, arylsulfonylamino or carbalkoxyamino groups; or electrophilic substituents such as halogens, e.g. fluorine, chlorine or bromine, functional derivatives of carboxyl groups and sulfonic acid groups which do not dissociate acid in neutral water, e.g. carboxylic and sulfonic acid amide groups optionally mono- or di-substituted at the nitrogen atom preferably with lower alkyl, phenyl or cyclohexyl, or carboxylic acid ester groups such as lower alkoxy carbonyl or phenoxy-carbonyl radicals, or sulfonic acid aryl ester groups, nitro, cyano or trifluoromethyl groups, arylazo groups such as phenylazo or naphthylazo groups, or acyl groups such as alkanoyl, aroyl, alkylsulfonyl or arylsulfonyl groups.

The aromatic rings which may be present in these substituents can be accordingly substituted in their turn by the aforesaid substituents.

More particularly, D represents a benzene radical optionally substituted by one or more of the following substituents: chlorine, lower alkyl, nitro, lower-alkylsulfonyl, phenylsulfonyl, sulfamoylphenylsulfonyl, acetylamino, sulfamoyl optionally N-mono- or N,N-disubstituted by lower alkyl or lower hydroxyalkyl, sulfamoyl-phenylazo; or D represents a naphthalene-sulfonic acid amide radical or a nitronaphthalene-sulfonic acid amide radical; or

represents a 7-aminobenzotriazole-(1,2,3) radical.

E preferably represents a benzene radical substituted by one or more of the following substituents: lower alkyl, chlorine, acetylamino or hydroxy; or a naphthalene radical optionally substituted by one or more of the following: hydroxy, amino, acetylamino, lower alkylphenylsulfonylamino, sulfamoyl, N-lower-alkyl - N - ($\beta$ - hydroxyethyl)-sulfamoyl, N-phenyl-carbamoyl, lower alkoxy-carbonyl, lower alkoxycarbonylamino; or a 1-phenyl-pyrazolone radical wherein the phenyl moiety is optionally substituted by lower alkyl, lower alkoxy, chlorine, nitro or sulfamoyl and wherein the pyrazolone moiety is substituted in 3-position by methyl or methoxycarbonyl, or it represents a 1-phenyl-3-methyl - 5 - aminopyrazole or an acetoacetic acid anilide radical.

Lower alkoxy groups such as methoxy or ethoxy groups, or acyloxy groups, e.g. lower alkanoyloxy groups, or (mononuclear aryl) sulfonyloxy groups such as the p-toluyl-sulfonyloxy group, are examples of the case when X in Formula I is a substituent which can be converted into a hydroxyl group. If X is a substituent which can be converted into a carboxyl group then it is, for example, a carboxylic acid ester group, particularly a lower alkoxycarbonyl group. If X is a substituent which can be converted into an alkylsulfonamido or arylsulfonamido group, then it represents, for example, a bis-(lower alkylsulfone)-amido or a bis-(mononuclear arylsulfone)-amido group. By "mononuclear aryl" as used in this specification and the appended claims there are meant phenyl, lower alkylphenyl, chloro-phenyl, bromophenyl, lower alkylsulfonylphenyl, phenylsulfonyl phenyl, nitro phenyl, methylsulfonylaminophenyl, lower alkanoylamino-phenyl, sulfamoylphenyl, N-lower alklyl - sulfamoylphenyl, N - hydroxylower alkyl-sulfamoylphenyl, hydroxyphenyl and sulfamoylphenyl-sulfonylphenyl.

Preferably, X is a hydroxyl group and X' is a hydroxyl group, an unsubstituted amino group, a lower alkylamino or an arylamino, especially a phenylamino group.

The reaction according to the invention of the complex Co$^{III}$-ligand compound with the azo dyestuff is advantageously performed in weakly acid, neutral or alkaline solution or dispersion. Suitable solvents, depending on the type of complex Co$^{III}$-ligand compound as defined and on the substitution of the azo dyestuff, are water or organic solvents miscible therewith such as alkanols, e.g. methanol, ethanol or butanol, alkylene glycols, e.g. ethylene glycol, propylene glycols or diethylene glycol, or their monoethers, e.g. ethylene glycol monomethyl or monoethyl ether, also ketones such as acetone, fatty acid amides, e.g. formamide or dimethyl formamide, ethers, e.g. dioxan, or secondary or tertiary nitrogen bases. Higher temperatures are often necessary for the reaction, but the reaction partners can also be reacted in the melt. As flux are suitable, e.g. salts of fatty acids such as sodium acetate, amides of fatty acids such as acetamide, also urea and thiourea and their N-substitution products.

The invention is performed, for example, by reacting one mol of a complex Co$^{3+}$-ligand compound which contains, per cobalt atom, two molecules of a colorless, tridentate organic ligand bound in complex linkage to the atom by way of three nitrogen atoms and is, moreover, free from ionogenic groups not taking part in the complex formation, with one mol of an azo dyestuff capable of forming bicyclic metal complexes and which is free from groups which dissociate acid in neutral water and do not take part in the complex formation A complex azo dyestuff-cobalt compound having cationic character, i.e. a basic dyestuff is obtained which contains one molecule of the above ligand and one molecule of azo dyestuff bound in complex linkage per cobalt atom.

Such new complex azo dyestuff-cobalt compounds are in the form of salts of strong inorganic or organic acids the anions of which are present at the time of the production. They are thus, especially, chlorides, bromides, sulfates, perchlorates or acetates. If desired, salts of other acids can also be produced by double decomposition, for example, oxalates by the addition of oxalic acid. Double salts can also be produced, e.g. with the dyestuff halides and corresponding zinc or cadmium salts.

These cationic dyestuffs are particularly suitable for the fast dyeing of polymeric and copolymeric acrylic fibers from aqueous solution.

The term "lower" as used in this specification in connection with "alkyl" and "alkoxy" means that these radicals have from 1 to 5 carbon atoms.

The following non-limitative examples serve to illustrate the invention. The temperatures are given in degrees centigrade; percentages are by weight unless expressly stated otherwise.

EXAMPLE 1

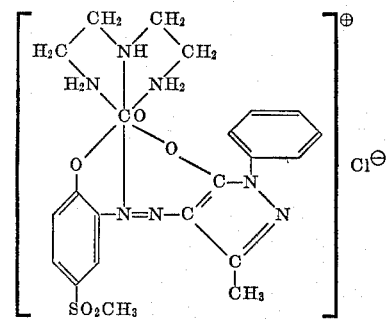

37.2 g. of the azo dyestuff 1-hydroxy-2-amino-4-methylsulfonyl - benzene→ 1-phenyl-3-methyl-5-pyrazolone are dissolved in 250 ml. of water and 50 ml. of 2 N sodium hydroxide solution at 80°. This solution is added dropwise to 450 ml. of an aqueous solution at 80–85° which contains bis-(diethylenetriamine)-cobalt (III) chloride (corresponding to 7.1 g. of Co) and 45.0 g. of sodium chloride.

The dyestuff of the above constitution precipitates. It is filtered off, washed with 20% sodium chloride solution and dried. It is a dark brown powder, which dyes polyacrylonitrile fibers in orange shades which have good fastness to light.

If the reaction is performed as described above but if in replacement of 45.0 g. of sodium chloride, first acetic acid is added until the reaction is acid to litmus paper and then 45.0 g. of zinc chloride are added, then the corresponding zinc chloride double salt precipitates.

If, instead of the azo dyestuff mentioned above, one of the azo dyestuffs mentioned in column 2 of the following Table I is used and if, instead of bis-(diethylenetriamine)-cobalt(III) chloride, one of the cobalt chelates mentioned in column 3 of the same table is used and otherwise the procedure given in the example is followed, then complex cobalt dyestuffs having good fastness to light are also obtained. The shades are given in column 4 of the same table.

TABLE I

| No. | Azo dyestuff | Cobalt (III) chelate from— | Shade on polyacrylonitrile fibers |
|---|---|---|---|
| 2 | 1-hydroxy-2-amino-4-methyl-sulfonyl-benzene → 1-phenyl-3-methyl-5-pyrazolone. | Dipropylenetriamine | Orange. |
| 3 | do | N,N',N''-triethyl-diethylenetriamine. | Do. |
| 4 | do | N,N-bis-($\beta$-phenyl-aminoethyl)-ethyl-amine. | Do. |
| 5 | do | N,N-bis-($\beta$-N'- piperidinoethyl)-ethyl-amine. | Do. |
| 6 | 1-hydroxy-2-amino-benzene-4-sulfonic acid amide → 1-phenyl-3-methyl-5-pyrazolone. | Diethylenetriamine | Do. |
| 7 | 1-hydroxy-2-amino-4-chlorobenzene → 1-(3'-sulfamoyl-phenyl)-3-methyl-5-pyrazolone. | Diethylenetriamine | Do. |

TABLE I—Continued

| No. | Azo dyestuff | Cobalt (III) chelate from— | Shade on polyacrylonitrile fibers |
|---|---|---|---|
| 8 | 1-hydroxy-2-amino-4-ethylsulfonyl-benzene → 1-(3'-chlorophenyl)-3-methyl-5-pyrazolone. | 1-amino-2-(β-amino-ethyl-amino)-cyclohexane. | Orange. |
| 9 | ___do___ | 1-amino-2-(β-amino-ethyl-amino)-benzene. | Do. |
| 10 | 1-hydroxy-2-amino-4-phenylsulfonyl-benzene → 1-(4'-methyl phenyl)-3-methyl-5-pyrazolone. | 2,2'-diamino-diphenylamine. | Do. |
| 11 | ___do___ | 2,2'-diamino-dicyclohexylamine. | Do. |
| 12 | 1-hydroxy-2-amino-4-ethylsulfonyl-benzene → 1-(3',4'-dichloro-phenyl)-3-methyl-5-pyrazolone. | Diethylenetriamine. | Do. |
| 13 | 1-hydroxy-2-amino-4-chloro-benzene → 1-(4''-methylsulfonyl-phenyl)-3-methyl-5-pyrazolone. | 2,6-(di-2'-pyridyl)-pyridine ("Terpyridyl"). | Do. |
| 14 | 1-hydroxy-2-amino-4-chlorobenzene → 1-(4'-methylsulfonyl-phenyl)-3-methyl-5-pyrazolone. | 8-(2'-aminophenyl-amino)-quinoline. | Do. |
| 15 | ___do___ | Dipropylenetriamine. | Do. |
| 16 | 1-hydroxy-2-amino-4-methylsulfonyl-benzene → 1-(3'-nitro-phenyl)-3-methyl-5-pyrazolone. | (2-pyridyl-methylene-amino-ethyl)-diethyl-amine. | Do. |
| 17 | 1-hydroxy-2-amino-4-methylsulfonyl-benzene → 1-(4'-methoxy-phenyl)-3-methyl-5-pyrazolone. | 1-(diethylamino)-2-(2'-pryidyl-methylene-amino)-benzene. | Do. |
| 18 | ___do___ | 1-(dimethylamino)-2-(2'-pyridylmethylene-amino)-cyclohexane. | Do. |
| 19 | 1-hydroxy-2-amino-4-ethylsulfonyl-benzene → 1-phenyl-3-carbonethoxy-5-pyrazolone. | 2-(2'-pyridylmethylene-aminomethyl)-pyridine (produced according to F. P. Dwyer and D. P. Mellor, "Chelating agents and metal chelates," page 144 ff). | Do. |
| 20 | ___do___ | 8-(2'-pyridylmethylene-amino)-quinoline. | Do. |
| 21 | 1-hydroxy-2-amino-4-ethylsulfonyl-benzene → 1-phenyl-3-carbomethoxy-5-pyrazolone. | 2,6-bis-(benzylamino-methylene)-pryidine. | Do. |
| 22 | ___do___ | 2,6-bis-(aminomethyl)-pyridine. | Do. |
| 23 | ___do___ | Pyridine-2,6-dialdehydedioxime. | Do. |
| 24 | ___do___ | Pyridine-2,6-dialdehyde-dihydrazone. | Do. |
| 25 | 1-hydroxy-2-amino-4-methylsulfonyl-benzene → 1-(2',5'-dichlorophenyl)-3-methyl-5-pyrazolone. | α, β, γ-Triamino-propane. | Do. |
| 26 | ___do___ | α, β, δ-Triaminobutane. | Do. |
| 27 | ___do___ | α, γ-Diamino-β-(amino-methyl)-propane. | Do. |
| 28 | ___do___ | 2-methoxy-4,6-didydrazino-1,3,5-triazine. | Do. |
| 29 | ___do___ | 2-amino-4,6-dihydrazino-1,3,5-triazine. | Do. |

EXAMPLE 30

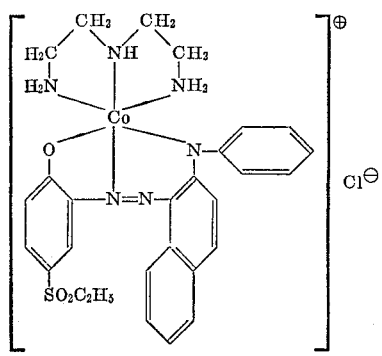

43.1 g. of the azo dyestuff 1-hydroxy-2-amino-4-ethylsulfonyl-benzene→2-phenylamino-naphthalene are dissolved in 400 ml. of ethylene glycol monomethyl ether and 50 ml. of 2 N sodium hydroxide solution at 80–90°. At the same temperature, an aqueous solution of bis-(diethylenetriamine)-cobalt(III) chloride, containing 7.1 g. of cobalt is quickly added to the well stirred mixture. The colour of the mixture changes from red to blue. The complex cobalt dyestuff of the above formula is formed and partly precipitates.

The reaction mixture is poured into 2000 ml. of 10% sodium chloride solution whereupon this cobalt-containing dyestuff completely precipitates. The dyestuff is filtered off, washed with dilute sodium chloride solution and dried.

The cobalt dyestuff formed is a blue-black powder which dyes polyacrylonitrile fibers in light fast blue-grey shades. Equally valuable dyestuffs are obtained when in the above example instead of an aqueous solution of bis-(diethylenetriamine)-cobalt(III) chloride containing 7.1 g. of cobalt, equivalent aqueous solution of bis-(diethylenetriamine)-cobalt(III) bromide, sulfate, perchlorate or acetate are used.

By using instead of the azo dyestuff mentioned above, one of the azo dyestuffs mentioned in column 2 of the following Table II and, instead of bis-(diethylenetriamine)-cobalt(III) chloride one of the cobalt chelates given in column 3, and otherwise following the procedure given in the example, then complex cobalt-containing dyestuffs are obtained, which afford on polyacrylonitrile fibers dyeings of good fastness to light in the shades given in column 4 of the same table.

TABLE II

| No. | Azo dyestuff | Cobalt (III) chelate from— | Shade on polyacrylonitrile fibers |
|---|---|---|---|
| 31 | 1-hydroxy-2-amino-4-nitro-benzene → 2-phenylamino-naphthalene. | Diethylenetriamine. | Blue-green. |
| 32 | 1-hydroxy-2-amino-4-chloro-benzene → 2-phenylamino-naphthalene. | Dipropylenetriamine. | Blue-grey. |
| 33 | 1-hydroxy-2-amino-4-methyl-benzene → 2-phenylamino-naphthalene. | α,β,γ-Triamino-propane. | Do. |
| 34 | 1-hydroxy-2-amino-4-nitro-6-chlorobenzene → 2-phenylamino-naphthalene. | Diethylenetriamine. | Blue-green. |
| 35 | 1-hydroxy-2-amino-4-methyl-benzene → 2-ethylamino-naphthalene. | ___do___ | Violet. |
| 36 | ___do___ | N,N',N''-triethyldi-ethylenetriamine. | Do. |
| 37 | 1-hydroxy-2-amino-4-chlorobenzene → 2-ethylaminonaphthalene. | Diethylenetriamine. | Blue-violet. |
| 38 | ___do___ | 1-amino-2-(β-amino-ethylamino)-cyclohexane. | Do. |
| 39 | 1-hydroxy-2-amino-4-methylsulfonyl benzene → 2-ethyl-amino-naphthalene. | Diethylenetriamine. | Blue-grey. |
| 40 | ___do___ | 1-amino-2-(β-amino-ethylamino)-benzene. | Do. |
| 41 | 1-hydroxy-2-amino-4-nitrobenzene → 2-ethylamino-naphthalene. | Diethylenetriamine. | Blue-green. |
| 42 | ___do___ | 2,2'-diamino-diphenylamine. | Do. |
| 43 | 1-hydroxy-2-amino-4,6-dinitrobenzene → 2-ethylamino-naphthalene. | Diethylenetriamine. | Green-grey. |
| 44 | ___do___ | 2,2'-diamino-dicyclohexylamine. | Do. |
| 45 | 1-hydroxy-2-amino-4,6-dichlorobenzene → 2-(β-hydroxy-ethyl-amino)-naphthalene. | Diethylenetriamine. | Blue-grey. |
| 46 | 1-hydroxy-2-amino-4,6-dichlorobenzene → 2-(β-hydroxyethylamino)-naphthalene. | α,β,δ-Triamino-butane. | Do. |
| 47 | 1-hydroxy-2-amino-4-methylsulfonyl-5-nitro-benzene → 2-(β-hydroxy-ethylamino)-naphthalene. | Diethylenetriamine. | Green-grey. |

TABLE II—Continued

| No. | Azo dyestuff | Cobalt (III) chelate from— | Shade on polyacrylonitrile fibers |
|---|---|---|---|
|  | ........do........ | α,γ-Diamino-β-aminomethylpropane. | Green-grey. |
| 49 | 1-hydroxy-2-amino-4-chlorobenzene → 2-hydroxy-naphthalene. | Diethylenetriamine | Bordeaux |
| 50 | 1-hydroxy-2-amino-4-methylsulfonyl-benezene → 2-hydroxy-naphthalene. | α,β,γ-Triaminopropane | Do. |
| 51 | 1-hydroxy-2-amino-4-nitrobenzene → 1-phenyl-3-methyl-5-pyrazolone. | Diethylenetriamine | Orange. |
| 52 | 1-hydroxy-2-amino-4-methylsulfonyl-benzene → 1-phenyl-3-methyl-5-amino-pyrazole. | ........do........ | Red-brown. |
| 53 | ........do........ | Dipropylenetriamine | Do. |
| 54 | 1-hydroxy-2-amino-4-ethylsulfonyl-benzene → acetoacetic acid-(2-chloroanilide). | Diethylenetriamine | Yellow. |
| 55 | 1-hydroxy-2-(2'-hydroxy-phenylazo)-4-chloro-benzene. | ........do........ | Red. |
| 56 | 1-hydroxy-2-amino-4-nitrobenzene → 2-hydroxy-naphthalene. | ........do........ | Bordeaux. |
| 57 | 1-hydroxy-2-amino-4-methylsulfonyl-benzene → 2-hydroxy-naphthalene. | ........do........ | Do. |
| 58 | 1-hydroxy-2-amino-4-ethylsulfonyl-benzene → 2-hydroxy-naphthalene. | ........do........ | Do. |
| 59 | 1-hydroxy-2-amino-5-nitrobenzene → 2-hydroxy-naphthalene. | ........do........ | Violet. |
| 60 | 1-hydroxy-2-amino-4-methylsulfonyl-5-nitro-benzene → 2-hydroxy-naphthalene. | ........do........ | Do. |
| 61 | 1-hydroxy-2-amino-5-nitrobenzene → 2-phenyl-aminonaphthalene. | ........do........ | Blue-green. |
| 62 | 1-hydroxy-2-amino-4-methylsulfonyl-benzene → 2-phenyl-amino-naphthalene. | ........do........ | Blue-grey. |
| 63 | 1-hydroxy-2-amino-4-ethylsulfonyl-benezene → 2-phenyl-amino-naphthalene. | (2-pyridyl-methylene-amino-ethyl)-diethyl-amine. | Do. |
| 64 | 7-amino-benzotriazole-(1,2,3) → 2-hydroxy-naphthalene. | Diethylenetriamine | Bordeaux. |
| 65 | 1-amino-2-(methylsulfonyl-amino)-benzene → 2-hydroxy-naphthalene. | ........do........ | Do. |
| 66 | 1-hydroxy-2-amino-4-methylsulfonyl-benzene → 2-phenyl-amino-naphthalene. | N,N''-dibenzyl-diethylenetriamine. | Blue-grey. |
| 67 | 1-hydroxy-2-amino-4-methylsulfonyl-benzene → 2-hydroxy-naphthalene. | Dipropylenetriamine | Bordeaux. |
| 68 | ........do........ | N,N',N''-triethyl-diethylenetriamine. | Do. |
| 69 | ........do........ | Dipropylenetriamine | Do. |
| 70 | ........do........ | α,γ-Diamino-β-(aminomethyl)-propane. | Do. |
| 71 | 1-hydroxy-2-amino-5-nitrobenzene → 2-hydroxy-naphthalene. | N,N-bis-(β-phenyl-amino-ethyl)-ethyl-amine. | Blue-violet. |
| 72 | ........do........ | N,N-bis-(β-N'-piperidino-ethyl)-ethyl-amine. | Do. |
| 73 | 1-hydroxy-2-amino-4-nitro-6-acetyl-amino-benzene → 2-hydroxy-naphthalene. | Diethylenetriamine | Bordeaux. |
| 74 | 1-hydroxy-2-amino-4-amyl-6-nitro-benzene → 2-hydroxy-naphthalene. | ........do........ | Do. |
| 75 | 1-hydroxy-2-amino-benzene-4-sulfonic acid amide → 2-hydroxy-naphthalene-3-carboxylic acid-N-phenyl-amide. | ........do........ | Do. |
| 76 | 1-hydroxy-2-amino-benzene-4-sulfonic acid-N-methyl-amide → 2-hydroxy-naphthalene-3-carboxylic acid ethyl ester. | ........do........ | Do. |
| 77 | 1-hydroxy-2-amino-benzene-4-sulfonic acid-N,N-bis-(β-hydroxy-ethyl)-amide → 2-hydroxy-8-carbomethoxy-amino-naphthalene. | Diethylenetriamine | Bordeaux. |
| 78 | 1-hydroxy-2-amino-4-methyl-benzene → 2-hydroxy-naphthalene-6-sulfonic acid-N-methyl-N-(β-hydroxy-ethyl)-amide. | ........do........ | Do. |
| 79 | 2-amino-4-chloro-benzoic acid → 2-hydroxy-naphthalene. | ........do........ | Do. |
| 80 | 1-hydroxy-2-amino-4-methyl-benzene → 2-ethylamino-naphthalene. | 2,2'-diamino-diphenyl-amine. | Blue-grey. |
| 81 | ........do........ | 2,2'-diamino-dicyclo-hexyl-amine. | Do. |
| 82 | 1-amino-2-hydroxy-4-nitrobenzene → 2-ethylamino-naphthalene. | 2,6-(di-2'-pryidyl)-pyridine. | Blue-green. |
| 83 | ........do........ | 2-methoxy-4,6-dihydrazino-1,3,5-triazine. | Do. |
| 84 | 1-hydroxy-2-amino-4-methyl-5-(3'-sulfamoyl-phenyl-azo)-benzene → 2-hydroxy-naphthalene. | Diethylenetriamine | Blue. |
| 85 | ........do........ | Dipropylenetriamine | Do. |
| 86 | ........do........ | 1-(diethylamino)-2-(2'-pyridyl-methylene-amino)-benzene. | Do. |
| 87 | ........do........ | 1-(dimethylamino)-2-(2'-pyridylmethylene-amino)-cyclohexane. | Do. |
| 88 | 1-hydroxy-2-amino-4-nitrobenzene → 1-hydroxy-3,4-dimethyl-benzene. | Diethylenetriamine | Brown. |
| 89 | 1-hydroxy-2-amino-4-nitrobenzene → 1-hydroxy-2-acetylamino-4-methyl-benzene. | ........do........ | Do. |
| 90 | 1-hydroxy-2-amino-4-ethylsulfonyl-benzene → 1-phenyl-3-methyl-5-pyrazolone. | ........do........ | Orange. |
| 91 | 1-hydroxy-2-amino-4-ethylsulfonyl-benzene → 1-phenyl-3-methyl-5-pyrazolone. | 2-(2'-pyridylmethylene-aminomethyl)-pyridine. | Do. |
| 92 | ........do........ | 8-(2'-pyridylmethylene-amino)-quinoline. | Do. |
| 93 | 1-hydroxy-2-amino-4-methylsulfonyl-benzene → 1-phenyl-3-methyl-5-amino-pyrazole. | 2,6-bis-(aminomethyl)-pyridine. | Red-brown. |
| 94 | ........do........ | 2,6-bis-(benzylamino-methylene)-pyridine. | Do. |
| 95 | 1-hydroxy-2-amino-4-nitrobenzene → acetoacetic acid-(2-chloro-anilide). | Diethylenetriamine | Yellow. |
| 96 | 1-amino-2-hydroxy-naphthalene-4-sulfonic acid amide → 2-hydroxy-naphthalene. | ........do........ | Grey-violet. |
| 97 | ........do........ | Dipropylenetriamine | Do. |
| 98 | ........do........ | N,N',N''-triethyl-diethylenetriamine. | Do. |
| 99 | ........do........ | 2,2'-diaminodiphenyl-amine. | Do. |
| 100 | ........do........ | 2,6-bis-(aminomethyl)-pyridine. | Do. |
| 101 | 1-amino-2-hydroxy-naphthalene-4-sulfonic-acid amide → 2-hydroxy-naphthalene. | α,β,γ-Triamino-propane. | Do. |
| 102 | ........do........ | α,γ-Diamino-β-(aminomethyl)-propane. | Do. |
| 103 | ........do........ | 2-amino-4,6-dihydrazino-1,3,5-triazine. | Do. |
| 104 | 1-amino-2-hydroxy-6-nitronaphthalene-4-sulfonic acid-amide → 1-hydroxy-naphthalene. | Diethylenetriamine | Brown-black. |
| 105 | 1-hydroxy-2-amino-4-chlorobenzene → 1,5-dihydroxy-naphthalene. | ........do........ | Violet. |
| 106 | 1-hydroxy-2-amino-4,6-dinitrobenzene → 1-hydroxy-naphthalene. | ........do........ | Brown-black. |
| 107 | 1-hydroxy-2-amino-4-methylbenzene → 2-hydroxy-naphthalene. | ........do........ | Red-violet. |

TABLE II—Continued

| No. | Azo dyestuff | Cobalt (III) chelate from— | Shade on polyacrylonitrile fibers |
|---|---|---|---|
| 108 | 1-hydroxy-2-amino-4-chlorobenzene alkaline → 1-hydroxy-7-amino-naphthalene-3-sulfonic acid amide. | Diethylenetriamine | Violet. |
| 109 | 1-hydroxy-2-amino-4-methyl-6-nitro-benzene → 6-hydroxy-2-acetylamino-naphthalene-8-sulfonic acid amide. | ___do___ | Grey-blue. |
| 110 | 1-hydroxy-2-amino-4-nitrobenzene → 2-hydroxy-6-(4'-methylphenyl-sulfonylamino)-naphthalene-8-sulfonic acid amide. | ___do___ | Do. |
| 111 | 1-hydroxy-2-amino-4-chlorobenzene → 2-hydroxy-8-acetylamino-naphthalene. | ___do___ | Do. |
| 112 | 1-hydroxy-2-amino-4-methyl-5-(3'-sulfamoyl-4'-chlorophenylazo)-benzene → 2-hydroxy-naphthalene. | ___do___ | Blue-green. |
| 113 | 1-hydroxy-2-amino-4-(3'-sulfamoyl-phenylazo)-benzene → 2-hydroxy-naphthalene. | ___do___ | Brown. |
| 114 | 1-amino-2-hydroxy-naphthalene-4-sulfonic acid amide → 1,3-dihydroxybenzene. | ___do___ | Brown-black. |
| 115 | 1-hydroxy-2-amino-4-methylbenzene → 1,3-dihydroxybenzene. | ___do___ | Red-violet. |
| 116 | 1-hydroxy-2-amino-4-methyl-6-nitro-benzene → 1-(3'-sulfamoyl-phenyl)-3-methyl-5-pyrazolone. | ___do___ | Orange. |
| 117 | 1-hydroxy-2-amino-6-nitrobenzene-4-sulfonic acid amide → 1-(3'-chlorophenyl)-3-methyl-5-pyrazolone. | ___do___ | Red. |
| 118 | 1-amino-2-hydroxy-naphthalene-4-sulfonic acid amide → 1-phenyl-3-methyl-5-pyrazolone. | ___do___ | Red. |
| 119 | 1-hydroxy-2-amino-4-nitrobenzene → 1-(4'-sulfamoyl-phenyl)-3-methyl-5-pyrazolone. | ___do___ | Orange. |
| 120 | 1-hydroxy-2-amino-4-nitrobenzene-6-sulfonic acid amide → 1-(3'-chlorophenyl)-3-methyl-5-pyrazolone. | ___do___ | Do. |
| 121 | 1-hydroxy-2-amino-4-(3'-sulfamoylphenyl-sulfonyl)-benzene → 1-phenyl-3-methyl-5-pyrazolone. | ___do___ | Do. |
| 122 | 1-hydroxy-2-amino-6-nitrobenzene-4-sulfonic acid amide → aceto-acetic acid-(2-chloro-anilide). | ___do___ | Yellow. |
| 123 | 1-hydroxy-2-amino-6-methylbenzene-4-sulfonic acid amide → 2-hydroxy-naphthalene. | ___do___ | Red-violet. |
| 124 | 1-hydroxy-2-amino-benzene-4-sulfonic acid amide → 1,5-dihydroxy-naphthalene. | ___do___ | Brown-black. |
| 125 | 1-hydroxy-2-amino-4,6-dinitro-benzene → 2-acetylamino-6-hydroxy-naphthalene-8-sulfonic acid amide. | ___do___ | Olive. |
| 126 | 1-hydroxy-2-amino-4-(3'-sulfamoylphenylazo)-benzene → 2-hydroxy-naphthalene | Dipropylenetriamine | Brown. |
| 127 | 1-amino-2-hydroxy-naphthalene-4-sulfonic acid amide → 1-phenyl-3-methyl-5-aminopyrazole. | Diethylenetriamine | Red-brown. |
| 128 | 1-amino-2-hydroxy-naphthalene-4-sulfonic acid amide → aceto-acetic acid-(2-chloro-anilide). | ___do___ | Yellow-orange. |
| 129 | 7-amino-benzotriazole-(1,2,3) → 1-phenyl-3-methyl-5-pyrazolone. | Diethylenetriamine | Orange. |
| 130 | 7-amino-benzotriazole-(1,2,3) → 1-phenyl-3-methyl-5-amino-pyrazole. | ___do___ | Brown. |

EXAMPLE 131

2 g. of the complex cobalt dyestuff obtained according to Example 1 are slurried with 2 g. of 40% acetic acid and 4000 ml. of hot water. 2 g. of sodium acetate and 4 g. of a condensation product of oleyl alcohol and 15 mols of ethylene oxide are added to this mixture and 100 g. of polyacrylonitrile fibers are introduced. The bath is heated to 90° within 30 minutes, kept at this temperature for 10 minutes and the fibers are dyed at the boil for 1 hour. The goods so treated are then soaped for 15 minutes at 80° in 5000 ml. of water with the addition of a sulfonated fatty acid condensation product, then rinsed and dried. The polyacrylonitrile fibers are dyed in orange shades which have good fastness to washing and light.

We claim:

1. A cationic complex azo dyestuff-cobalt compound consisting essentially of, per molecule:
   a cobalt atom;
   one molecule of a colorless tridentate organic ligand which is coordinatively bound to said cobalt atom by way of three nitrogen atoms, each of said nitrogen atoms participating in the formation of a five- to six-membered ring of which said cobalt atom is a member, said ligand being selected from the group consisting of diethylenetriamine, dipropylenetriamine and monoethylene-mono-propylene-triamine, said triamines being unsubstituted or N-lower alkyl-substituted, α,β,γ-triaminopropane,
   α,β,δ-triaminobutane,
   α,γ-diamino-β-(aminomethyl)-propane,
   N,N-bis-(β-phenylaminoethyl)-N-ethylamine,
   N,N''-dibenzyldiethylenetriamine,
   N,N-bis-(β-N'-piperidinoethyl)-N-ethylamine,
   1-amino-2-(β-amino-ethylamino)-cyclohexane,
   2,2'-diaminodicyclohexylamine,
   1-amino-2-(β-amino-ethylamino)-benzene,
   2,2'-diamino-diphenylamine,
   2,6-(di-2'-pyridyl)-pyridine,
   8-(2'-amino-phenylamino)-quinoline,
   (2-pyridylmethylene-aminoethyl)-diethylamine,
   1-(diethylamino)-2-(2'-pyridyl-methylene-amino)-benzene,
   1-(dimethylamino)-2-(2'-pyridyl-methylene-amino)-cyclohexane,
   2-(2'-pyridyl-methylene-amino-methyl)-pyridine,
   8-(2'-pyridyl-methyleneamino)-quinoline,
   2,6-bis-(benzyl-aminomethylene)-pyridine,
   2,6-bis-(aminomethyl)-pyridine,
   pyridine-2,6-dialdehyde dioxime,
   pyridine-2,6-dialdehyde-dihydrazone,
   2-methoxy-4,6-dihydrazino-1,3,6-triazine and
   2-amino-4,6-dihydrazino-1,3,5-triazine; and
   one radical of a mono- or disazo dyestuff of the formula

(I)

wherein —D—N=N—E— is the divalent radical of a dyestuff selected from a benzene-azo-benzene dyestuff, a benzene-azo-naphthalene dyestuff, a benzene-azo-(1-phenyl-5-hydroxy-pyrazole) dyestuff, a benzene-azo-(1-phenyl-5-amino-pyrazole) dyestuff, a benzene-azo-acylaceto-phenylamide dyestuff, a benzene-azo-benzene-azo-naphthalene dyestuff, a naphthalene-azo-naphthalene dyestuff and a naphthalene-azo-(1-phenyl-5-hydroxy-pyrazole) dyestuff, any substituents of said dyestuffs being selected from hydrogen, chlorine, bromine, lower alkyl, lower alkoxy, nitro, hydroxyl, lower-alkyl-sulfonyl, phenylsulfonyl, lower-alkylphenylsulfonyl, lower-alkylphenylsulfonylamino, amino, acetylamino, carbo-lower-alkoxyamino, a radical of the formula

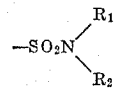

wherein $R_1$ represents hydrogen, lower alkyl, hydroxyethyl, phenyl or lower alkylphenyl and $R_2$ represents hydrogen, lower alkyl or hydroxyethyl; carboxylic acid-N-phenylamide and carboxylic acid lower-alkyl ester, X is linked in ortho-position to the azo bridge to a ring carbon atom of D and represents —O—, —COO— or lower-alkyl-sulfonamido, and X' is linked in ortho-position to the azo bridge to a ring carbon atom of E and represents —O—, —N-(lower alkyl)-, —N-(hydroxy-lower-alkyl)-, —N-(phenyl)- or —NH—, said dyestuff being capable of forming a bicyclic metal complex with cobalt;

and a colorless anion selected from the group consisting of chloride, bromide, sulfate, perchlorate and acetate anions, and wherein said lower alkyl and lower alkoxy moieties have from 1 to 5 carbon atoms.

2. Cobalt complexes of the formula

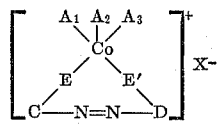

wherein C is phenylene or naphthalene radicals substituted by chlorine, nitro, lower alkoxy and phenylazo; D is naphthalene or pyrazole radicals substituted by lower alkyl, amino, sulfoanilino; E is attached to C in ortho position to the azo group and is —O— or —COO—; E' attached to D in ortho position to the azo group and is —O— or —NH—; A1, A2 and A3 together form a polydentate ligand bound to said coblat atom by way of three nitrogen atoms, said ligand being selected from the group consisting of diethylenetriamine, 1:2:3-triaminopropane, N-lower alkyl substituted triaminopropane and X⁻ is an anion.

3. A cationic complex azo dyestuff-cobalt compound as defined in claim 1, wherein the colorless ligand is a dialkylenetriamine or a triaminoalkane.

4. A cationic complex azo dyestuff-cobalt compound as defined in claim 1, wherein the colorless ligand is diethylenetriamine.

5. A cationic complex azo dyestuff-cobalt compound as defined in claim 1 wherein said dyestuff radical is that of a benzene-azo-(1-phenyl - 3 - methyl-pyrazol-5-one) dyestuff substituted as defined and bearing a hydroxyl group at the benzene moiety in ortho position to the azo bridge.

6. A cationic dyestuff as defined in claim 1, which is of the formula

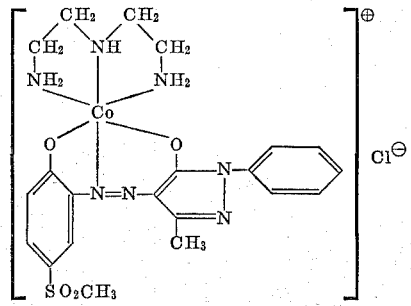

7. A cationic dyestuff as defined in claim 1, which is of the formula

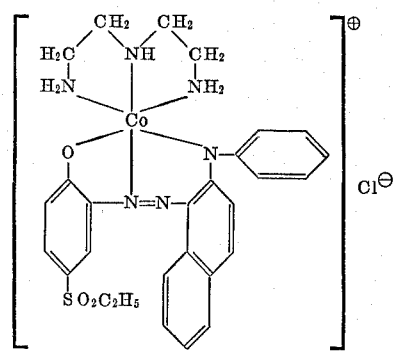

8. A cationic dyestuff as defined in claim 1, which is of the formula

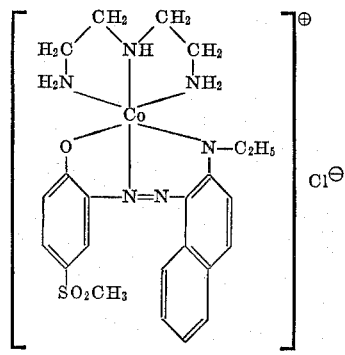

9. A cationic dyestuff as defined in claim 1, which is of the formula

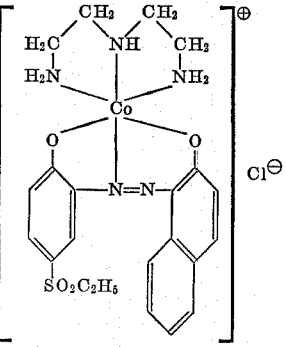

10. A cationic dyestuff as defined in claim 1, which is of the formula

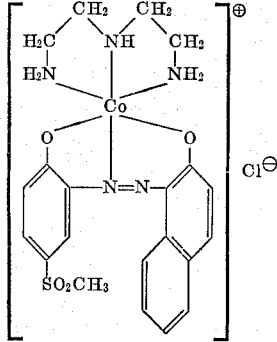

References Cited
UNITED STATES PATENTS 3,356,671   12/1967   Johnson et al. _____ 260—145

FLOYD D. HIGEL, Primary Examiner

U.S. Cl. X.R.

8—41 A; 260—146 R, 146 T, 148, 149, 150, 151